United States Patent
Fu et al.

(10) Patent No.: US 10,775,535 B2
(45) Date of Patent: Sep. 15, 2020

(54) COMPOSITE DIFFUSER AND ULTRA-THIN DIRECT TYPE BACKLIGHT MODULE

(71) Applicant: HUIZHOU CHINA STAR OPTOELECTRONICS TECHNOLOGY CO., LTD., Huizhou Guangdong (CN)

(72) Inventors: Linlin Fu, Huizhou Guangdong (CN); Xiaoyu He, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 350 days.

(21) Appl. No.: 15/752,186

(22) PCT Filed: Jan. 19, 2018

(86) PCT No.: PCT/CN2018/073477
§ 371 (c)(1),
(2) Date: Feb. 12, 2018

(87) PCT Pub. No.: WO2019/127754
PCT Pub. Date: Jul. 4, 2019

(65) Prior Publication Data
US 2020/0132890 A1    Apr. 30, 2020

(30) Foreign Application Priority Data

Dec. 26, 2017   (CN) .......................... 2017 1 1435600

(51) Int. Cl.
*G02B 5/02*  (2006.01)
*F21S 2/00*  (2016.01)
(Continued)

(52) U.S. Cl.
CPC ................ *G02B 5/02* (2013.01); *F21S 2/005* (2013.01); *F21V 5/00* (2013.01); *G02B 6/0025* (2013.01); *F21Y 2115/10* (2016.08)

(58) Field of Classification Search
None
See application file for complete search history.

(56) References Cited

U.S. PATENT DOCUMENTS

2014/0055985  A1* 2/2014 Zhang .................. G02B 5/0226
                                                         362/97.1
2016/0077248  A1  3/2016 Shim et al.

FOREIGN PATENT DOCUMENTS

CN        1847949 A    10/2006
CN      101261329 A     9/2008
(Continued)

*Primary Examiner* — Britt D Hanley
(74) *Attorney, Agent, or Firm* — Hemisphere Law, PLLC; Zhigang Ma

(57) ABSTRACT

This invention provides a composite diffuser plate comprising a light-emitting layer for emitting light, a middle layer for guiding light, and a light-entering layer for entering light, being sequentially stacked downwardly. At least one surface of the middle layer is provided with an array of curved protrusions. Refractive indexes of the light-emitting layer, the middle layer and the light-entering layer are gradually increased. This invention further provides an ultra-thin direct type backlight module. In the composite diffuser plate of this invention, in addition to a gradual increase in refractive indexes of the light-emitting layer, the middle layer and the light-entering layer, the middle layer is provided with a microstructure having curved protrusions, which further enhances diverging effect of emitting angle. The direct-light TV can increase a light-emitting area with a small OD value, and thus improves a LED Mura problem, realizing a slim direct-light TV and enhancing market competitiveness.

15 Claims, 3 Drawing Sheets

(51) Int. Cl.
*F21V 5/00* (2018.01)
*F21V 8/00* (2006.01)
*F21Y 115/10* (2016.01)

(56) References Cited

FOREIGN PATENT DOCUMENTS

| | | |
|---|---|---|
| CN | 201228916 Y | 4/2009 |
| CN | 101493536 A | 7/2009 |
| CN | 101554817 A | 10/2009 |
| CN | 102798908 A | 11/2010 |
| CN | 105793743 A | 7/2016 |
| CN | 105870358 A | 8/2016 |

* cited by examiner

Major axis

COMPOSITE DIFFUSER AND ULTRA-THIN DIRECT TYPE BACKLIGHT MODULE

RELATED APPLICATIONS

The present application is a National Phase of International Application Number PCT/CN2018/073477, filed Jan. 19, 2018, and claims the priority of China Application No. 201711435600.0, filed Dec. 26, 2017.

FIELD OF THE DISCLOSURE

The present invention relates to a field of display technology, and in particular to a composite diffuser plate and an ultra-thin direct type backlight (direct-light) module.

BACKGROUND

With consumer's increasing demanding for the appearance of electronic display products such as TV, notebook and monitor, a thinner and narrower bezel design of a whole TV is highlighted more and more by consumers.

Currently, a TV of edge-light model quickly occupies an ultra-thin TV market due to an achievement of a thinner TV by reducing the size of light emitting diodes (LED), the thickness of a light guide plate, and the thickness of a prism, as well as using a manner of whole pasting and other ways. However, since the price of a light guide plate in a TV of an edge-light model is relatively high, and the number of LED dies used therein is relatively large, this model has no cost advantage, and cannot have a broader market for a low-end consumer group, although it is easier for that model to reach a thinning purpose.

Contract to an edge-light TV, since the cost of a diffuser plate in a backlight structure of a direct-light TV with a same size is lower, and the number of LED dies is relatively less, a direct-light TV has an apparent advantage in price. However, due to a limitation in design, the closer the distance between the diffuser plate and the LED is, the easier it is to see the LED, resulting in a poor qualification. Moreover, since an emitting angle of the LED is limited, a zone between adjacent LEDs is a non-luminous dark area, which forms an uneven brightness area with a neighbor LED emitting area. Although the diffuser plate and the prism have an effect of diffusion and shielding to the light passing through the diffuser plate and the prism, they are not enough to resolve the problem of uneven brightness. When the pitch between the LEDs is larger, it is easier to appear Mura (shadow) in light paths between adjacent LEDs. Thus, it is required the LED density to be large enough. Therefore, if it is willing to let a TV of direct-light model pass a qualification requirement, a sufficient optical distance (OD) value between the diffuser plate and the reflector should be insured so as to prevent an appearance of a LED Mura. Therefore, although a direct-light TV has an advantage in cost in comparison with the edge-light TV, it has an embarrassing situation that fails to get the market share in the field of ultra-thin TV.

SUMMARY

In view of shortcomings of prior art, the present invention provides a composite diffuser plate and an ultra-thin direct-light backlight module which can increase an area of light-emitting in a direct-light TV with a smaller OD value and thus can improve the problem of LED Mura. A slim direct-light TV therefore comes true, which in turn enhances market competitiveness of products.

In order to achieve the above object, the present invention adopts the following technical solutions.

The present invention provides a composite diffuser plate which includes a light-emitting layer for emitting light, a middle layer for guiding light, and a light-entering layer for entering light, which are sequentially stacked from top to bottom, wherein at least one surface of the middle layer is provided with an array of curved protrusions, and refractive indexes of the light-emitting layer, the middle layer and the light-entering layer are gradually increased.

As one of the embodiments, the light-emitting layer and the light-entering layer are fully adhered to the middle layer respectively.

As one of the embodiments, both surfaces of the middle layer are provided with curved protrusions in an array respectively.

As one of the embodiments, a surface of the curved protrusion is a part of a spherical surface.

As one of the embodiments, a surface of the curved protrusion is a part of an ellipsoidal surface, and the curved protrusion is a spindle body.

As one of the embodiments, each of the curved protrusions has a height smaller than a width thereof.

As one of the embodiments, each of the curved protrusions has a width smaller than a diameter of the spherical surface of the curved protrusion.

As one of the embodiments, there is a gap in every two adjacent curved protrusions.

As one of the embodiments, each of the curved protrusions is same to the others, and gaps in respective two adjacent curved protrusions have a same width.

Another object of the present invention is to provide an ultra-thin direct type backlight module comprising an LED light source and a composite diffuser plate. The LED light source emits light toward the composite diffuser plate and is disposed adjacent to the composite diffuser plate with Interval.

According to the composite diffuser plate of the present invention, in addition to a gradual increase in refractive indexes of the light-emitting layer, the middle layer and the light-entering layer, the middle layer is also provided with a microstructure having curved protrusions, which further enhances the effect of divergence of emitting angle. By means of that, the direct-light TV can increase light-emitting area with a small OD value, and thus improves the LED Mura problem, realizing a slimness of the direct-light TV and enhancing its market competitiveness.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments.

Figure 1:
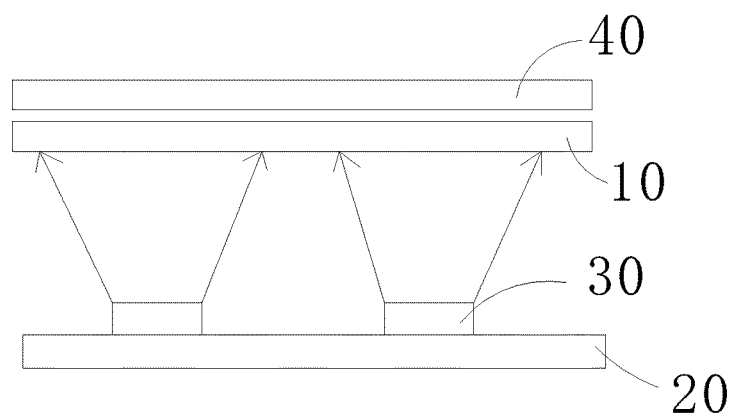
FIG. 1 is a schematic structural view of a main structure of a backlight module according to an embodiment of the present invention.

Referring to FIG. 1, an ultra-thin direct type backlight module according to an embodiment of the present invention includes a composite diffuser plate 10, a reflector 20, an LED light source 30 and an optical film, or called prism, 40. The LED light source 30 is disposed on the reflector 20 in an array. A surface of the reflector 20 that is provided with the LED light source 30 faces the composite diffuser plate 10. The LED light source 30 is spaced apart from the composite diffuser plate 10. The optical film 40 is disposed above the composite diffuser plate 10 to further process the light emitting from the composite diffuser plate 10.

The light emitted by the LED light source 30 directly enters the upper composite diffuser plate 10 and a part of the light is reflected back to the reflector 20 due to the reflection of various optical elements. The reflector 20 can reflect the incident light again to the composite diffuser plate 10 for secondary use.

Figure 2:
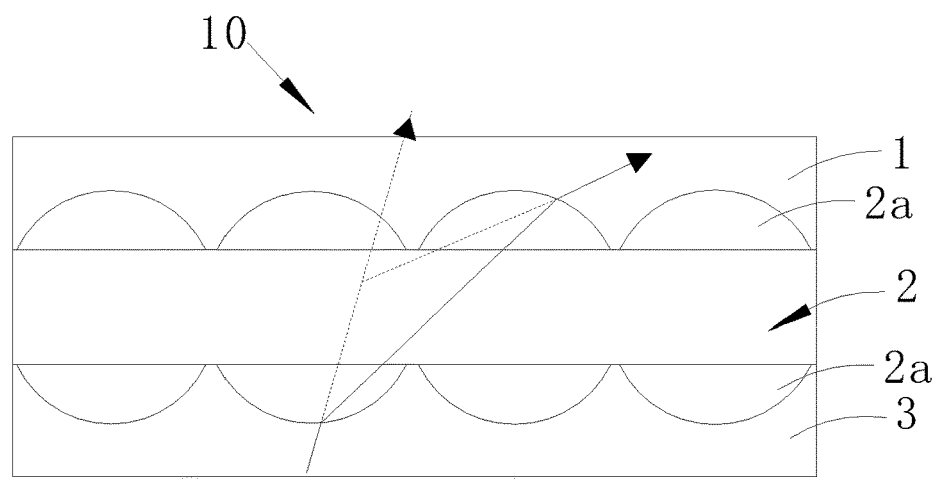
FIG. 2 is a schematic structural view of a composite diffuser plate according to an embodiment of the present invention.

As shown in FIG. 2, the composite diffuser plate 10 includes a light-emitting layer 1 for emitting light, a middle layer 2 for guiding light, and a light-entering layer 3 for entering light, which are sequentially stacked from top to bottom. Both surfaces of the middle layer are provided with arrays of curved protrusions 2a, which form curved microstructures. The refractive indexes of the light-emitting layer 1, the middle layer 2 and the light-entering layer 3 are gradually increased. In other embodiments, the microstructure having the curved protrusions 2a may be provided only on one surface of the middle layer 2, which can also increase an emitting angle to a certain extent.

Figure 3:
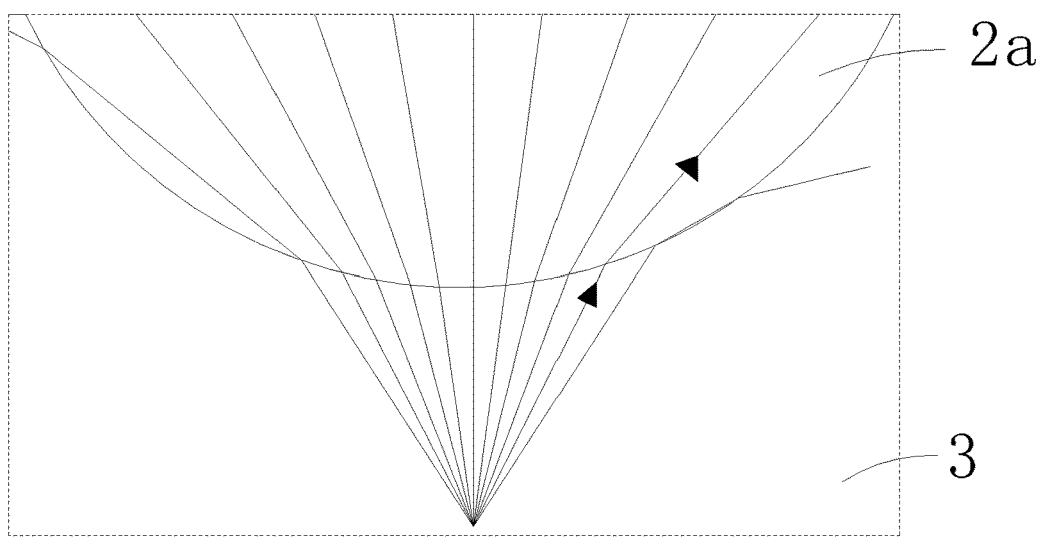
FIG. 3 is a schematic diagram of an optical path on a light incident side of a middle layer according to an embodiment of the present invention.
Figure 4:
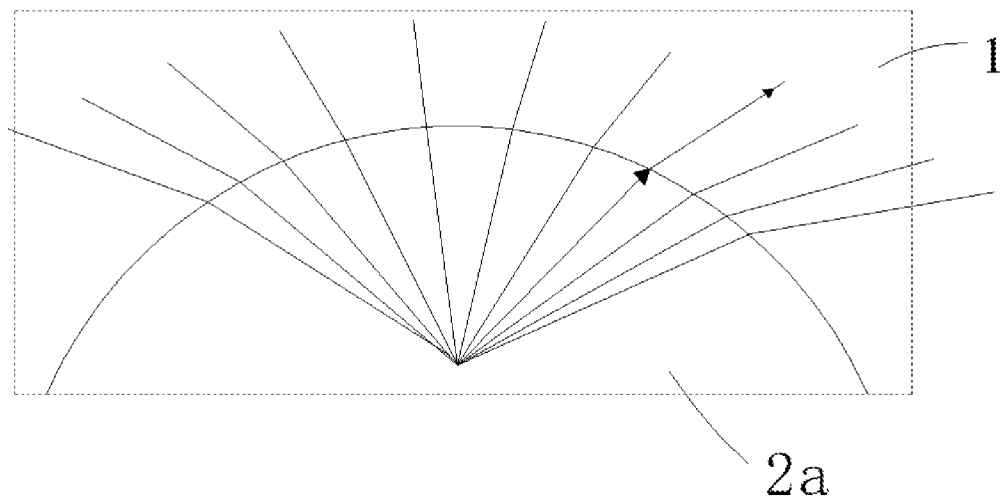
FIG. 4 is a schematic diagram of an optical path on a light emitting side of a middle layer according to an embodiment of the present invention.

As shown in FIGS. 2 to 4, originally a light incident into the middle layer 2 from the light-entering layer 3 is emitted along a straight line and directly out from an upper side of the middle layer 2. However, due to a provision of the curved protrusions 2a on both upper and lower surfaces of the middle layer 2 of the composite diffuser plate 10 in this embodiment, when the light incident into the light-entering layer 3 enters the middle layer 2, it is refracted first to increase the incident angle of the light, and at the same time, the incident angle of the light is further diverged due to the presence of the curved protrusions 2a, such as FIG. 3. When the light emits from the curved protrusion 2a on the upper surface of the middle layer 2, the unique configuration of the curved protrusion 2a further diverges the exit angle of the light, such as FIG. 4, and at the same time, the emitting angle of the light from the curved protrusions 2a into the upper light-emitting layer 1 is further enlarged. Finally, the exit angle of the light emitted from the light-emitting layer 1 is far greater than the incident angle of the light at an interface into the light-entering layer 3, and thus the exit angle of the light is significantly increased. Therefore, under a condition of a same OD value, a single LED light source 30 can cover a larger backlight range, and a pitch between two adjacent LED light sources 30 can be larger. The number of the LED light sources 30 required for backlighting can be reduced, and thus the cost of the module is saved. In addition, under a premise of a same number of LED light sources 30, the OD value between the LED light source 30 and the composite diffuser plate 10 can also be made smaller so that a thinner backlight module and display panel can be realized. In the meanwhile, the LED Mura problem is also improved, which in turn is advantageous for product competitiveness.

Figure 5:
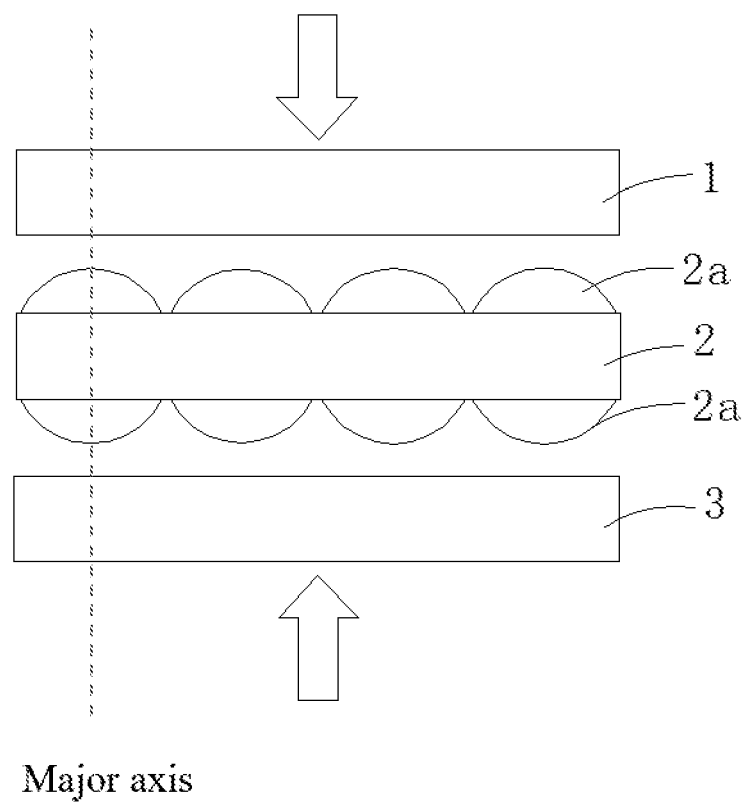
FIG. 5 is a schematic diagram showing a production process of a composite diffuser plate according to an embodiment of the present invention.

As shown in FIG. 5, in this embodiment, the curved protrusions 2a on two surfaces of the middle layer 2 can be formed by rolling with a mold. Then, the light-emitting layer 1 and the light-entering layer 3 are respectively formed by press on the middle Layer 2. The light-emitting layer 1 and the light-entering layer 3 are respectively fully adhered to the middle layer 2, and thus there is no gap between the three layers so that the light passes through the light-entering layer 3, the middle layer 2 and the light-emitting layer 1 will not have an energy loss caused by air propagation. In other embodiments, it is also able to have a gap between the middle layer 2 and the light-emitting layer 1 as well as the light-entering layer 3. In this situation, part of the light will be refracted and transmitted in the air. However, a transmission efficiency of such a light is lowered apparently.

Figure 6:
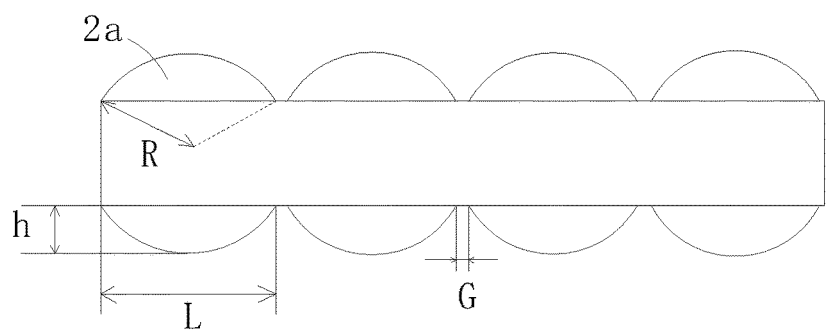
FIG. 6 is a side view of a middle layer in a composite diffuser plate according to an embodiment of the present invention.
Figure 7:
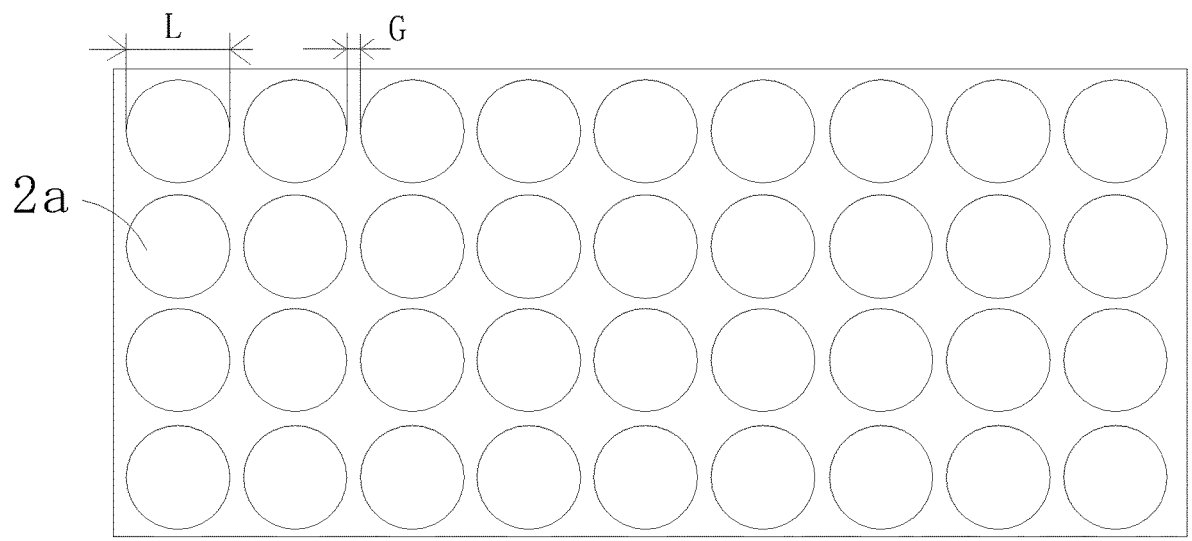
FIG. 7 is a plan view of a middle layer in a composite diffuser plate according to an embodiment of the present invention.

As shown in FIG. 6 and FIG. 7, in this embodiment, the surface of the curved protrusion 2a is a part of a spherical surface, and the spherical surface of the curved protrusion 2a is in contact with a flat surface of the middle layer 2. The height h of each curved protrusion 2a is smaller than the width L thereof, and the width L of each curved protrusion 2a is smaller than the diameter 2R of the spherical surface where the curved protrusion 2a is located. In this way, the curved protrusion 2a can be ensured that its entire surface faces toward the front of the light-emitting layer 1 on which light emits.

There is a gap G in every two adjacent curved protrusions 2a. The curved protrusions 2a are uniformly arranged on the upper and lower surfaces of the middle layer 2, and each of the curved protrusions 2a is exactly the same. The gaps G in respective two adjacent curved projections 2a are equal in width. Therefore, the light processed by the composite diffuser plate 10 can maintain a uniform backlight brightness and achieve a larger divergence angle. The existence of the gap G makes the adjacent two curved projections 2a do not overlap with each other in terms of boundary, avoiding a generation of a local high brightness and improving uniformity of light emission.

It can be understood that the surface of the curved protrusion 2a is a part of an ellipsoid, and the curved protrusion 2a is a spindle body. That is, the periphery of the curved protrusion 2a is a symmetrical structure, and the major axis of its elliptical cross section is perpendicular to the light-emitting layer 1 and the light-entering layer 3. Thus, the light emitted from each side of the curved protrusion 2a can be symmetrical and uniform.

In view of the above, in the composite diffuser plate of the present invention, in addition to a gradual increase in refractive indexes of the light emitting layer, the middle layer and the light entering layer, the middle layer is also provided with microstructures with curved protrusions on both surfaces thereof, and thus an effect of diverging the emitting angle is further enhanced, which in turn makes the direct-light TV have an increased area of emitting light under a situation having a smaller OD value. The LED Mura problem is therefore improved, and a slim TV of direct-light model comes true, which raises market competitiveness thereof.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A composite diffuser plate comprising a light-emitting layer for emitting light, a middle layer for guiding light, and a light-entering layer for entering light, which are sequentially stacked from top to bottom, wherein at least one surface of the middle layer is provided with an array of curved protrusions, a refractive index of the light-emitting layer is less than a refractive index of the middle layer, and the refractive index of the middle layer is less than a refractive index of the light-entering layer;

wherein each of the curved protrusions is same to the others, the curved protrusions are separate from each other, there is a gap between two adjacent curved protrusions, and gaps between two adjacent curved protrusions have a same width.

2. The composite diffuser plate as claimed in claim 1, wherein the light-emitting layer and the light-entering layer are fully adhered to the middle layer respectively.

3. The composite diffuser plate as claimed in claim 2, wherein both surfaces of the middle layer are provided with curved protrusions in an array respectively.

4. The composite diffuser plate as claimed in claim 3, wherein a surface of each of the curved protrusions is a part of a spherical surface.

5. The composite diffuser plate as claimed in claim 2, wherein a surface of each of the curved protrusions is a part of an ellipsoidal surface, a periphery of each the curved protrusions is a symmetrical structure, and a major axis of its elliptical cross section is perpendicular to the light-emitting layer and the light-entering layer.

6. The composite diffuser plate as claimed in claim 4, wherein each of the curved protrusions has a height smaller than a width thereof.

7. The composite diffuser plate as claimed in claim 6, wherein each of the curved protrusions has a width smaller than a diameter of the spherical surface of the curved protrusion.

8. An ultra-thin direct type backlight module comprising an LED light source and a composite diffuser plate, wherein the LED light source emits light toward the composite diffuser plate and is disposed adjacent to the composite diffuser plate with Interval, wherein the composite diffuser plate comprises a light-emitting layer for emitting light, a middle layer for guiding light, and a light-entering layer for entering light, which are sequentially stacked from top to bottom, and wherein at least one surface of the middle layer is provided with an array of curved protrusions, a refractive index of the light-emitting layer is less than a refractive index of the middle layer, and the refractive index of the middle layer is less than a refractive index of the light-entering layer;

wherein each of the curved protrusions is same to the others, the curved protrusions are separate from each other, there is a gap between two adjacent curved protrusions, and gaps between two adjacent curved protrusions have a same width.

9. The composite diffuser plate as claimed in claim 8, wherein the light-emitting layer and the light-entering layer are fully adhered to the middle layer respectively.

10. The composite diffuser plate as claimed in claim 9, wherein both surfaces of the middle layer are provided with curved protrusions in an array respectively.

11. The composite diffuser plate as claimed in claim 10, wherein a surface of each of the curved protrusions is a part of a spherical surface.

12. The composite diffuser plate as claimed in claim 9, wherein a surface of each of the curved protrusions is a part of an ellipsoidal surface, a periphery of each the curved protrusions is a symmetrical structure, and a major axis of its elliptical cross section is perpendicular to the light-emitting layer and the light-entering layer.

13. The composite diffuser plate as claimed in claim 11, wherein each of the curved protrusions has a height smaller than a width thereof.

14. The composite diffuser plate as claimed in claim 13, wherein each of the curved protrusions has a width smaller than a diameter of the spherical surface of the curved protrusion.

15. An ultra-thin direct type backlight module comprising an LED light source and a composite diffuser plate, wherein the LED light source emits light toward the composite diffuser plate and is disposed adjacent to the composite diffuser plate with Interval, wherein the composite diffuser plate comprises a light-emitting layer for emitting light, a middle layer for guiding light, and a light-entering layer for entering light, which are sequentially stacked from top to bottom, and wherein at least one surface of the middle layer is provided with an array of curved protrusions, a refractive index of the light-emitting layer is less than a refractive index of the middle layer, and the refractive index of the middle layer is less than a refractive index of the light-entering layer, each of the curved protrusions is same to the others, the curved protrusions are separate from each other, there is a gap between two adjacent curved protrusions, and gaps between two adjacent curved protrusions have a same width.

* * * * *